Patented Dec. 18, 1951

2,579,442

UNITED STATES PATENT OFFICE 2,579,442

POLYMERIZATION OF ETHYLENICALLY UNSATURATED COMPOUNDS WITH CYANURIC TRIAZIDE CATALYST

Harold F. Park, East Longmeadow, and Henry A. Walter, Longmeadow, Mass., assignors to Monsanto Chemical Company, St. Louis, Mo., a corporation of Delaware No Drawing. Application December 14, 1950, Serial No. 200,873

2 Claims. (Cl. 260—93.5)

This invention relates to the polymerization of unsaturated organic compounds. More particularly, the invention relates to a new catalyst for the polymerization process.

The polymerization of most unsaturated organic compounds may be accomplished in the absence of catalysts at ordinary temperatures to yield polymers of extremely high molecular weight. Under these conditions, the process is extremely long and impractical. The reaction may be accelerated by raising the temperature and in some cases by using superatmospheric pressure. Under these conditions, the polymer is obtained more quickly but the molecular weight of the product decreases in proportion to the increase in the temperature.

Many materials have been suggested for use as catalysts to increase the reaction rate without unduly lowering the molecular weight of the polymer formed. Some of these catalysts operate to reduce the polymerization time sufficiently to render the process of practical importance and they produce polymers which are sufficiently high in molecular weight to be useful for many purposes. However, most of the catalysts heretofore proposed leave an undesirable residue in the polymer which, either during the reaction or later during storage and ageing, cause discoloration of the polymeric material.

One object of this invention is to provide a new catalyst for the polymerization of ethylenically unsaturated organic compounds.

Another object is to provide a catalyst for polymerization reactions which will produce polymers of relatively high molecular weight.

Still another object is to provide a polymerization catalyst which does not cause appreciable discoloration of the polymer.

These and other objects are attained by polymerizing ethylenically unsaturated organic compounds in contact with catalytic amounts of cyanuric triazide.

The following examples are given in illustration and are not intended as limitations of the scope of this invention. Where parts are mentioned, they are parts by weight.

Example I

Styrene was polymerized by dissolving about 0.3 part of cyanuric triazide in 100 parts of styrene, placing the solution in a reaction vessel, evacuating the vessel to remove oxygen, sealing the evacuated vessel, and thereafter heating the vessel at 150° C. for six hours. The reaction vessel was then opened and the product removed. It was found that the polymerization reaction was substantially complete, i. e., less than 3% of styrene monomer could be detected in the polymer. The polymer was a tough transparent and colorless resin which had a specific viscosity of 0.224.

When the process of Example I was repeated but the catalyst was omitted, conversion was incomplete at the end of six hours and the specific viscosity of the polymer produced was 0.157. When 0.3 part of benzoyl peroxide was used in the process of Example I instead of the cyanuric triazide, the specific viscosity of the polymer was 0.121.

The specific viscosity mentioned above is the basic measurement used for the determination of molecular weight. There are several methods of calculating the molecular weight from the specific viscosity and there is some doubt as to which method is correct. However, by all methods, increased specific viscosity is indicative of increased molecular weight. For example, when calculated by the Staudinger method, an increase of specific viscosity of 0.01 represents an increase in molecular weight of 2500 to 3000.

Example II

Example I was repeated except that the temperature was raised to 180° C. Polymerization was substantially complete in 30 minutes as compared to the six hours necessary at 150° C. The polymer was tough, transparent and colorless and had a specific viscosity of 0.141. This indicated a molecular weight which, though lower than that of the polymer of Example I, is still higher than that of the polymer produced at 150° C. with benzoyl peroxide. When the polymerization was carried out at 180° C. in the absence of catalyst, the polymer produced at the end of 30 minutes had a specific viscosity of 0.087 and the reaction was far from completed.

Cyanuric triazide is an efficient catalyst for the polymerization and copolymerization of unsaturated organic compounds containing ethylenic unsaturation such as olefins, diolefins, polyenes, vinylidene compounds, vinyl compounds, acrylic compounds, allylic compounds, butene dioic derivatives, etc. It may be used in concentrations varying between 0.05 and 0.5 part per 100 parts of monomer or monomer mixture. If desired, a mixture of cyanuric triazide and other well-known catalysts such as the organic per compounds may be used.

The temperature of the polymerization may be varied to suit the particular monomers being polymerized. Thus, for vinyl chloride the temperature should be below 100° C. and for styrene it may be as high as 180° C. The process may be carried out under superatmospheric pressure as is generally necessary in the polymerization of gaseous monomers such as ethylene and butadiene.

Cyanuric triazide has the advantage that it is an extremely active polymerization catalyst which promotes the production of polymers and copolymers of relatively high molecular weight. It does not cause appreciable discoloration of the polymers and leaves no residue which adversely affects the ageing properties of the polymers.

It is obvious that variations may be made in the processes and products of this invention without departing from the spirit and scope thereof as defined in the appended claims.

What is claimed is:

1. A process which comprises mass polymerizing an organic ethylenically unsaturated polymerizable monomer in contact with a catalytic amount of cyanuric triazide said process being carried out at an elevated temperature sufficient to effect polymerization.

2. A process which comprises mass polymerizing styrene in contact with a catalytic amount of cyanuric triazide said process being carried out at an elevated temperature sufficient to effect polymerization.

HAROLD F. PARK.
HENRY A. WALTER.

No references cited.